(12) United States Patent
Moura et al.

(10) Patent No.: US 10,215,410 B2
(45) Date of Patent: Feb. 26, 2019

(54) TURBINE ENGINE COMBUSTOR HEAT SHIELD WITH MULTI-ANGLED COOLING APERTURES

(71) Applicant: United Technologies Corporation, Farmington, CT (US)

(72) Inventors: Dennis M. Moura, South Windsor, CT (US); Monica Pacheco-Tougas, Waltham, MA (US); Jonathan J. Eastwood, Newington, CT (US); Lee E. Bouldin, Woodbridge, CT (US)

(73) Assignee: United Technologies Corporation, Farmington, CT (US)

( * ) Notice: Subject to any disclaimer, the term of this patent is extended or adjusted under 35 U.S.C. 154(b) by 261 days.

(21) Appl. No.: 15/032,119

(22) PCT Filed: Nov. 4, 2014

(86) PCT No.: PCT/US2014/063859
§ 371 (c)(1),
(2) Date: Apr. 26, 2016

(87) PCT Pub. No.: WO2015/112221
PCT Pub. Date: Jul. 30, 2015

(65) Prior Publication Data
US 2016/0265773 A1 Sep. 15, 2016

Related U.S. Application Data

(60) Provisional application No. 61/899,540, filed on Nov. 4, 2013.

(51) Int. Cl.
*F23R 3/00* (2006.01)
*F23R 3/06* (2006.01)
(Continued)

(52) U.S. Cl.
CPC ............... *F23R 3/002* (2013.01); *F02C 7/18* (2013.01); *F02C 7/24* (2013.01); *F23M 5/00* (2013.01);
(Continued)

(58) Field of Classification Search
CPC .......... F02C 7/18; F02C 7/24; F05D 2240/15; F05D 2240/35; F05D 2260/201;
(Continued)

(56) References Cited

U.S. PATENT DOCUMENTS 5,220,795 A 6/1993 Dodds et al.
5,241,827 A * 9/1993 Lampes ................. F01D 5/184
60/754

(Continued)

OTHER PUBLICATIONS

Extended EP Search Report dated Oct. 4, 2016.

*Primary Examiner* — Scott J Walthour
(74) *Attorney, Agent, or Firm* — O'Shea Getz P.C.

(57) ABSTRACT

A combustor for a turbine engine is provided that includes a combustor wall. The combustor wall includes a shell and heat shield, which is attached to the shell. One or more cooling cavities are defined between the shell and the heat shield, and fluidly couple a plurality of apertures defined in the shell with a plurality of apertures defined in the heat shield. The apertures in the heat shield include a first aperture and a second aperture. An angle of incidence between the first aperture and a surface of the heat shield is different than an angle of incidence between the second aperture and the surface.

13 Claims, 8 Drawing Sheets

(51) Int. Cl.
*F23R 3/50* (2006.01)
*F23M 5/00* (2006.01)
*F23M 5/08* (2006.01)
*F02C 7/18* (2006.01)
*F02C 7/24* (2006.01)
*F23R 3/04* (2006.01)

(52) U.S. Cl.
CPC ............. *F23M 5/08* (2013.01); *F23M 5/085* (2013.01); *F23R 3/005* (2013.01); *F23R 3/007* (2013.01); *F23R 3/04* (2013.01); *F23R 3/06* (2013.01); *F23R 3/50* (2013.01); *F05D 2220/32* (2013.01); *F05D 2240/15* (2013.01); *F05D 2240/35* (2013.01); *F05D 2260/201* (2013.01); *F05D 2260/202* (2013.01); *F05D 2260/941* (2013.01); *F23R 2900/03041* (2013.01); *F23R 2900/03042* (2013.01); *F23R 2900/03044* (2013.01)

(58) Field of Classification Search
CPC ...... F05D 2260/941; F23M 5/00; F23M 5/08; F23M 5/085; F23R 3/002; F23R 3/005; F23R 3/007; F23R 3/04; F23R 3/06; F23R 3/50; F23R 2900/03041; F23R 2900/03042; F23R 2900/03044
See application file for complete search history.

(56) References Cited

U.S. PATENT DOCUMENTS

| | | | |
|---|---|---|---|
| 6,145,319 A * | 11/2000 | Burns | F23R 3/002 60/754 |
| 6,205,789 B1 | 3/2001 | Patterson et al. | |
| 7,093,439 B2 | 8/2006 | Pacheco-Tougas et al. | |
| 7,363,763 B2 | 4/2008 | Coughlan, III et al. | |
| 7,954,325 B2 | 6/2011 | Burd et al. | |
| 8,015,829 B2 | 9/2011 | Coughlan, III et al. | |
| 2003/0213250 A1 | 11/2003 | Pacheco-Tougas et al. | |
| 2004/0104538 A1 * | 6/2004 | Pidcock | F23R 3/002 277/549 |
| 2007/0130953 A1 | 6/2007 | Burd et al. | |
| 2007/0209366 A1 * | 9/2007 | Gerendas | F23R 3/002 60/752 |
| 2008/0271457 A1 | 11/2008 | McMasters et al. | |
| 2010/0095679 A1 * | 4/2010 | Rudrapatna | F23R 3/005 60/752 |
| 2011/0030378 A1 * | 2/2011 | Carlisle | F23R 3/002 60/753 |
| 2011/0126543 A1 | 6/2011 | Kirsopp et al. | |
| 2011/0185740 A1 | 8/2011 | Dierberger et al. | |
| 2013/0255266 A1 | 10/2013 | Kim et al. | |
| 2014/0238030 A1 | 8/2014 | Gerendas | |
| 2015/0260399 A1 | 9/2015 | Low | |
| 2016/0238253 A1 | 8/2016 | Moura et al. | |

* cited by examiner

TURBINE ENGINE COMBUSTOR HEAT SHIELD WITH MULTI-ANGLED COOLING APERTURES

CROSS-REFERENCE TO RELATED APPLICATION

This application claims priority to PCT Patent Application No. PCT/US14/063859 filed Nov. 4, 2014, which claims priority to U.S. Provisional Patent Appln. No. 61/899,540 filed Nov. 4, 2013, which are hereby incorporated herein by reference in their entireties.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead that extends radially between inner and outer combustor walls. Each of the combustor walls includes a shell and a heat shield, which defines a radial side of a combustion chamber. Cooling cavities extend radially between the heat shield and the shell. These cooling cavities fluidly couple impingement apertures in the shell with effusion apertures in the heat shield.

There is a need in the art for an improved turbine engine combustor.

SUMMARY OF THE DISCLOSURE

According to an aspect of the invention, a combustor for a turbine engine is provided that includes a combustor wall. The combustor wall includes a shell and a heat shield attached to the shell. One or more cooling cavities are defined between the shell and the heat shield, and fluidly couple a plurality of apertures defined in the shell with a plurality of apertures defined in the heat shield. The apertures in the heat shield include a first aperture and a second aperture. An angle of incidence between the first aperture and a surface of the heat shield is different than an angle of incidence between the second aperture and the surface.

According to another aspect of the invention, another combustor for a turbine engine is provided that includes a combustor wall. The combustor wall includes a shell and a heat shield attached to the shell. The heat shield defines a plurality of effusion apertures, which include a first aperture and a second aperture. The first aperture extends along a centerline that is offset from a surface of the heat shield by a first angle. The second aperture extends along a centerline that is offset from the surface by a second angle that is different than the first angle.

According to another aspect of the invention, another combustor is provided for a turbine engine. This combustor includes a combustor shell and a combustor heat shield, which is attached to the shell. One or more cooling cavities are defined between the shell and the heat shield, and fluidly couple a plurality of apertures defined in the shell with a plurality of apertures defined in the heat shield. The apertures in the heat shield include a first aperture and a second aperture. An angle of incidence between the first aperture and a surface of the heat shield is different than an angle of incidence between the second aperture and the surface.

The one or more cooling cavities may include a first cavity and a second cavity. The first aperture may be fluidly coupled with the first cavity. The second aperture may be fluidly coupled with the second cavity.

An angle of incidence between (i) each of the apertures in the heat shield that are fluidly coupled with the first cavity and (ii) the surface may be substantially equal to the angle of incidence between the first aperture and the surface.

The combustor wall may include a rail arranged between the first cavity and the second cavity.

The one or more cooling cavities may include a first cavity. The aperture and the second aperture may be fluidly coupled with the first cavity.

The heat shield may include a plurality of panels. A first of the panels may include the first aperture and the second aperture. Alternatively, a first of the panels may include the first aperture and a second of the panels may include the second aperture.

The first of the panels may extend between an upstream end and a downstream end. The second aperture may be located at the downstream end. The angle of incidence of the second aperture may be greater than the angle of incidence of the first aperture.

The apertures in the heat shield may be configured as or otherwise include effusion apertures. The apertures in the shell may be configured as or otherwise include impingement apertures.

A diameter of the first aperture at the surface may be substantially equal to a diameter of the second aperture at the surface.

A diameter of the first aperture at the surface may be different than a diameter of the second aperture at the surface.

A diameter of the first aperture may increase as the first aperture extends through the heat shield away from the shell. A diameter of the second aperture may also or alternatively increase as the second aperture extends through the heat shield away from the shell.

A plurality of cooling cavities may extend and be defined between the shell and the heat shield. The first aperture may be fluidly coupled with a first of the cooling cavities. The second aperture may be fluidly coupled with a second of the cooling cavities.

A cooling cavity may extend and be defined between the shell and the heat shield. The first aperture and the second aperture may be fluidly coupled with the cooling cavity.

The combustor may include a combustor first wall, a combustor second wall and a combustor bulkhead. The second wall may include the shell and the heat shield. The bulkhead may extend between the first wall and the second wall. The first wall, the second wall and the bulkhead may form a combustion chamber.

The first aperture may be one of a plurality of first apertures defined in the heat shield. A density of the first apertures in a first region of the heat shield may be different (e.g., less) than a density of the first apertures in a second region of the heat shield. In addition or alternatively, the second aperture may be one of a plurality of second apertures defined in the heat shield. A density of the second apertures in the first region of the heat shield may be different (e.g., greater) than a density of the second apertures in the second region of the heat shield.

The density of the first and/or second apertures in the first region and the density of the first and/or second apertures in the second region may be selected to provide more cooling to first region than the second region.

The foregoing features and the operation of the invention will become more apparent in light of the following description and the accompanying drawings.

DETAILED DESCRIPTION OF THE INVENTION

Figure 1:
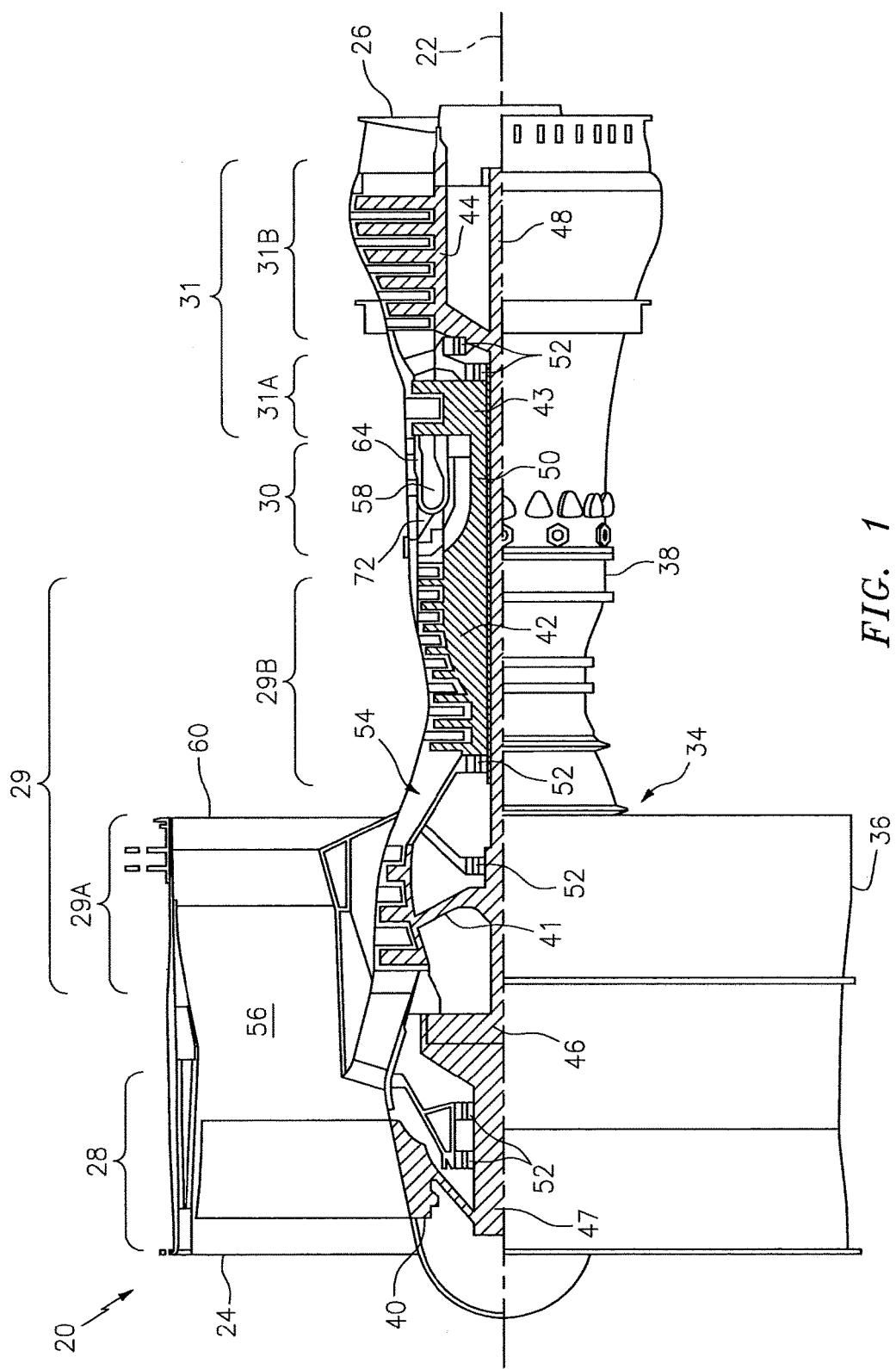
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 (e.g., an epicyclic gear train) through a shaft 47. The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52. Each of the bearings 52 is connected to the second engine case 38 by at least one stator such as, for example, an annular support strut.

Air enters the turbine engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the turbine engine 20 through the airflow exhaust 26. Within the combustor section 30, fuel is injected into an annular combustion chamber 58 and mixed with the core air. This fuel-core air mixture is ignited to power the turbine engine 20 and provide forward engine thrust. The bypass air is directed through the bypass gas path 56 and out of the turbine engine 20 through a bypass nozzle 60 to provide additional forward engine thrust. Alternatively, the bypass air may be directed out of the turbine engine 20 through a thrust reverser to provide reverse engine thrust.

Figure 2:
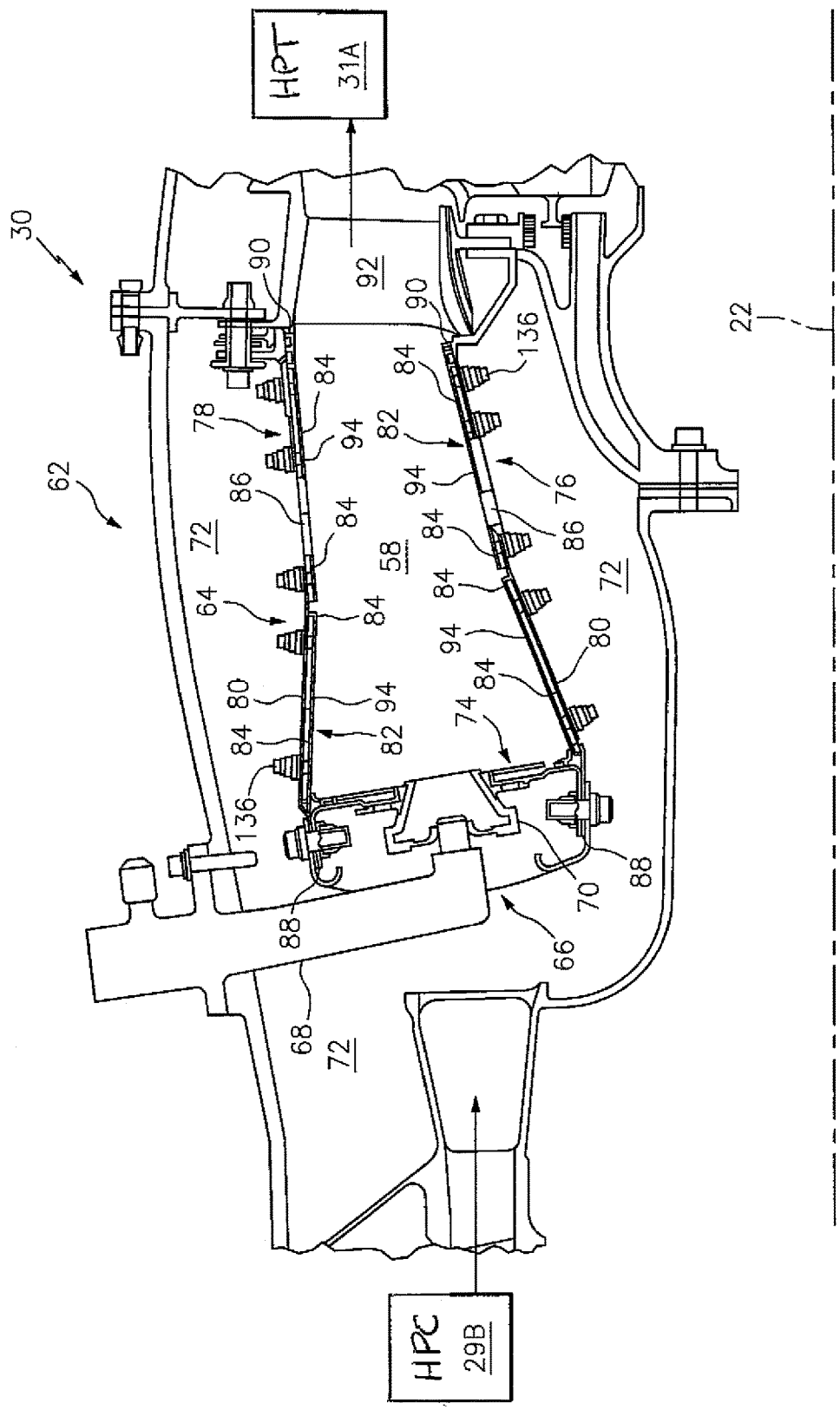
FIG. 2 is a side cutaway illustration of a portion of a combustor section.

FIG. 2 illustrates an assembly 62 of the turbine engine 20. This turbine engine assembly 62 includes a combustor 64. The turbine engine assembly 62 also includes one or more fuel injector assemblies 66, each of which may include a fuel injector 68 mated with a swirler 70.

Figure 3:
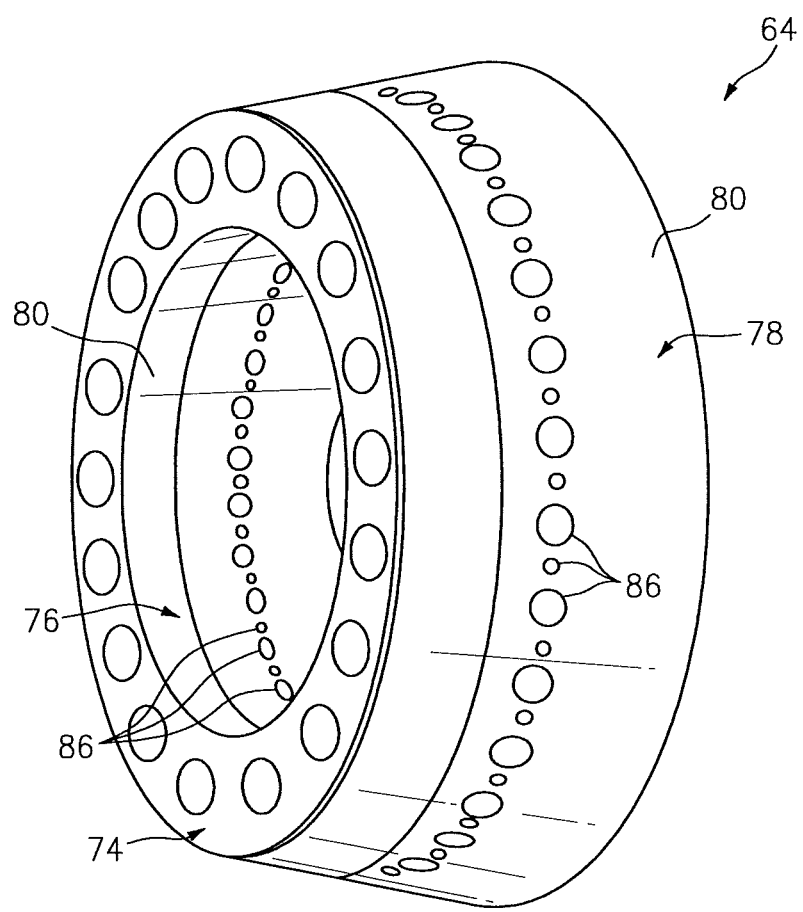
FIG. 3 is a perspective illustration of a portion of a combustor.

The combustor 64 may be configured as an annular floating wall combustor, which may be arranged within an annular plenum 72 of the combustor section 30. The combustor 64 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the turbine section 31A, thereby defining the combustion chamber 58.

Referring to FIG. 2, the inner wall 76 and the outer wall 78 may each have a multi-walled structure; e.g., a hollow dual-walled structure. The inner wall 76 and the outer wall 78 of FIG. 2, for example, each includes a tubular combustor shell 80 and a tubular combustor heat shield 82. The inner wall 76 and the outer wall 78 also each includes one or more cooling cavities 84 (e.g., impingement cavities) and one or more quench apertures 86, which are arranged circumferentially around the centerline 22.

The shell 80 extends circumferentially around the centerline 22. The shell 80 extends axially along the centerline 22 between an upstream end 88 and a downstream end 90. The shell 80 is connected to the bulkhead 74 at the upstream end 88. The shell 80 may be connected to a stator vane assembly 92 or the HPT section 31A at the downstream end 90.

Figure 4:
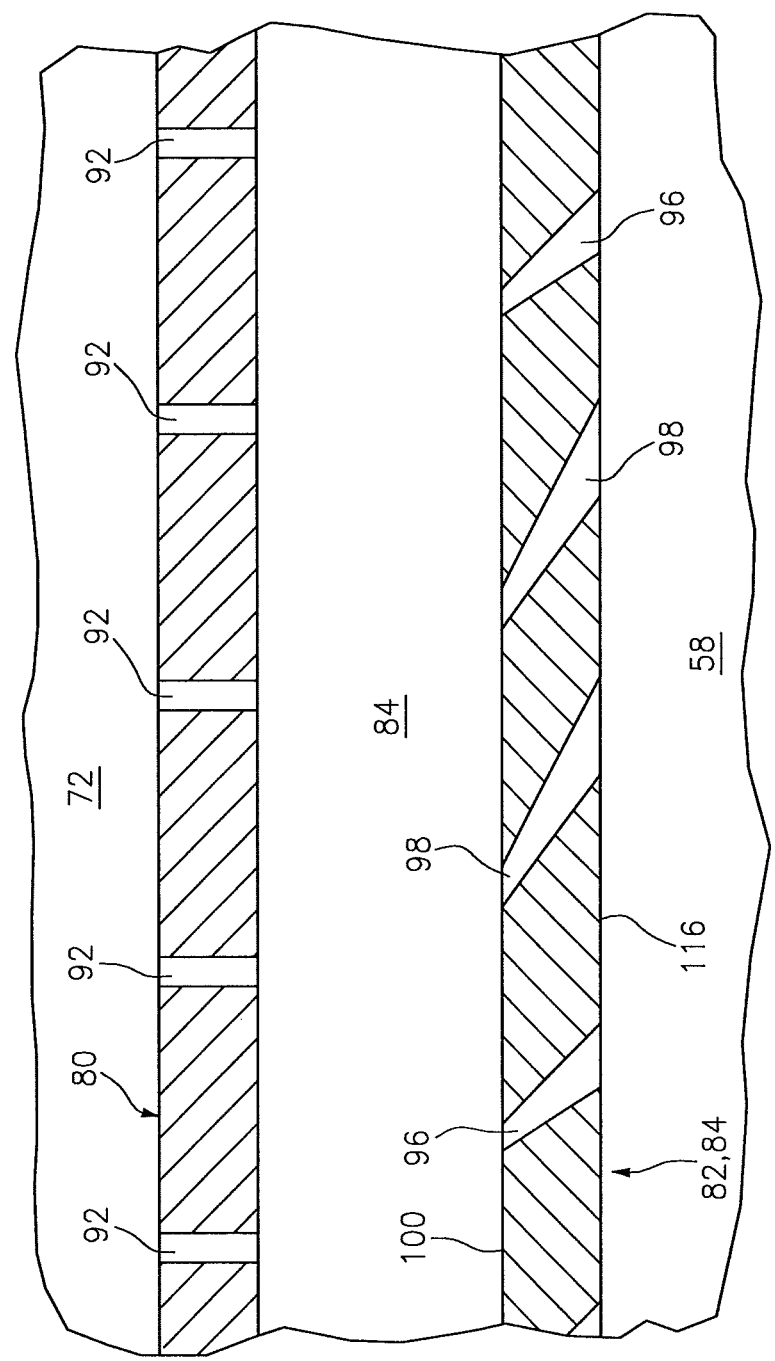
FIG. 4 is a side sectional illustration of a portion of a combustor wall.

Referring to FIG. 4, the shell 80 includes one or more cooling apertures 92. One or more of these cooling apertures 92 may each be configured as an impingement aperture. Each cooling aperture 92, for example, may direct core air from the plenum 72 into a respective one of the cooling cavities 84 to impinge against the heat shield 82.

Referring to FIG. 2, the heat shield 82 extends circumferentially around the centerline 22. The heat shield 82 extends axially along the centerline 22 between an upstream end and a downstream end. The heat shield 82 may include one or more heat shield panels 94. These panels 94 may be arranged into one or more axial sets. The axial sets are arranged at discrete locations along the centerline 22. The panels 94 in each set are disposed circumferentially around the centerline 22 and form a hoop. Alternatively, the heat shield 82 may be configured from one or more tubular bodies.

Figure 5:
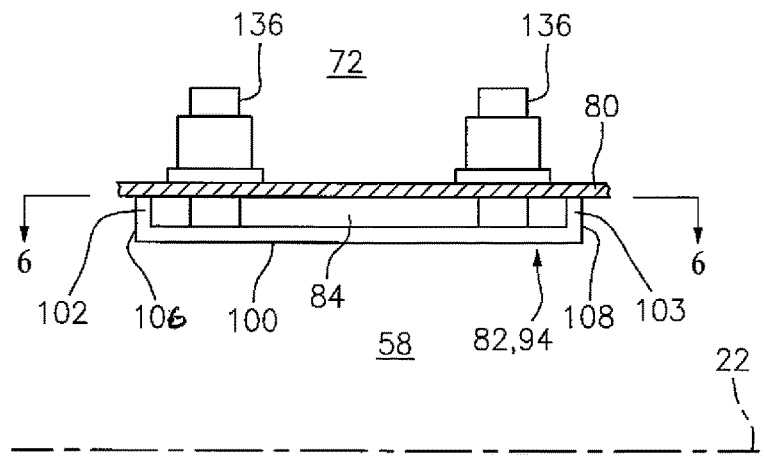
FIG. 5 is a side sectional illustration of another portion of the combustor wall.
Figure 6:
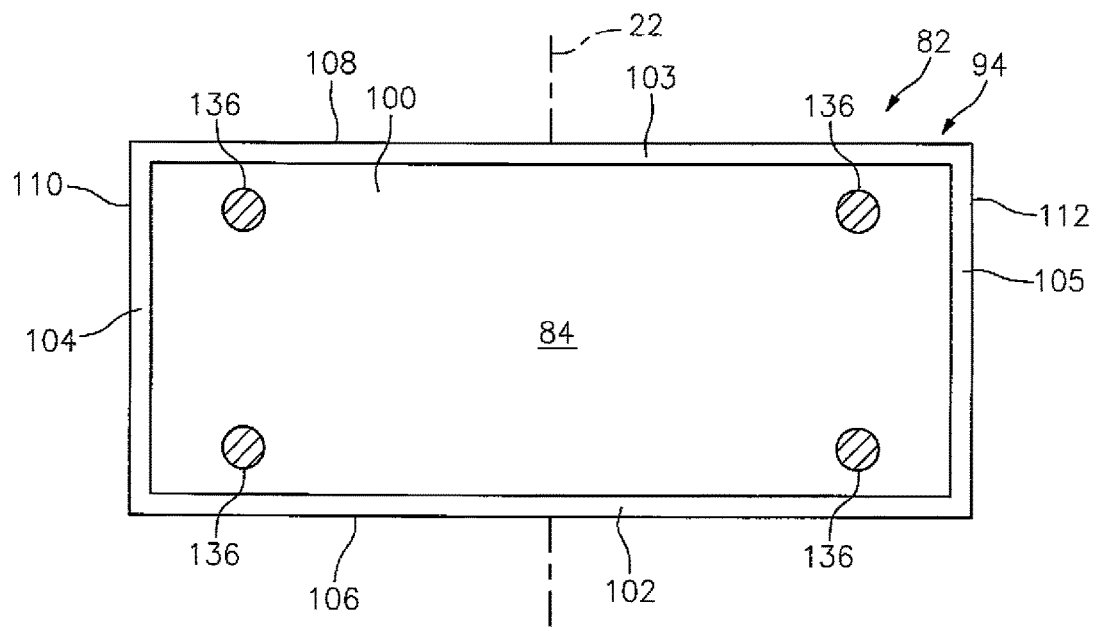
FIG. 6 is a sectional illustration of a heat shield panel.

FIGS. 5 and 6 illustrate an exemplary one of the panels 94. It should be noted that each panel 94 may include one or more cooling apertures (e.g., first and/or second apertures 96 and 98) as described below in further detail. For ease of illustration, however, the panel 94 of FIGS. 5 and 6 is shown without the cooling apertures.

Each of the panels 94 includes a panel base 100 and one or more panel rails (e.g., rails 102-105). The panel base 100 may be configured as a generally curved (e.g., arcuate) plate. The panel base 100 extends axially between an upstream axial end 106 and a downstream axial end 108. The panel base 100 extends circumferentially between opposing circumferential ends 110 and 112.

The panel rails may include one or more circumferentially extending end rails 102 and 103 and one more axially extending end rails 104 and 105. Each of the foregoing rails 102-105 extends radially out from (or in from) the panel base 100. The rail 102 is arranged at (e.g., on, adjacent or proximate) the axial end 106. The rail 103 is arranged at the axial end 108. The rails 104 and 105 extend axially between and are connected to the rails 102 and 103. The rail 104 is arranged at the circumferential end 110. The rail 105 is arranged at the circumferential end 112.

Referring to FIG. 4, one or more of the panels 94 also each includes one or more of the cooling apertures 96 and/or 98. The panel 94 of FIG. 4, for example, defines a plurality of the first apertures 96 and a plurality of the second apertures 98. One or more of these cooling apertures 96 and 98 may each be configured as an effusion aperture. Each cooling aperture 96, 98, for example, may direct core air from a respective one of the cooling cavities 84 into the combustion chamber 58 to film cool the heat shield 82.

Figure 7:
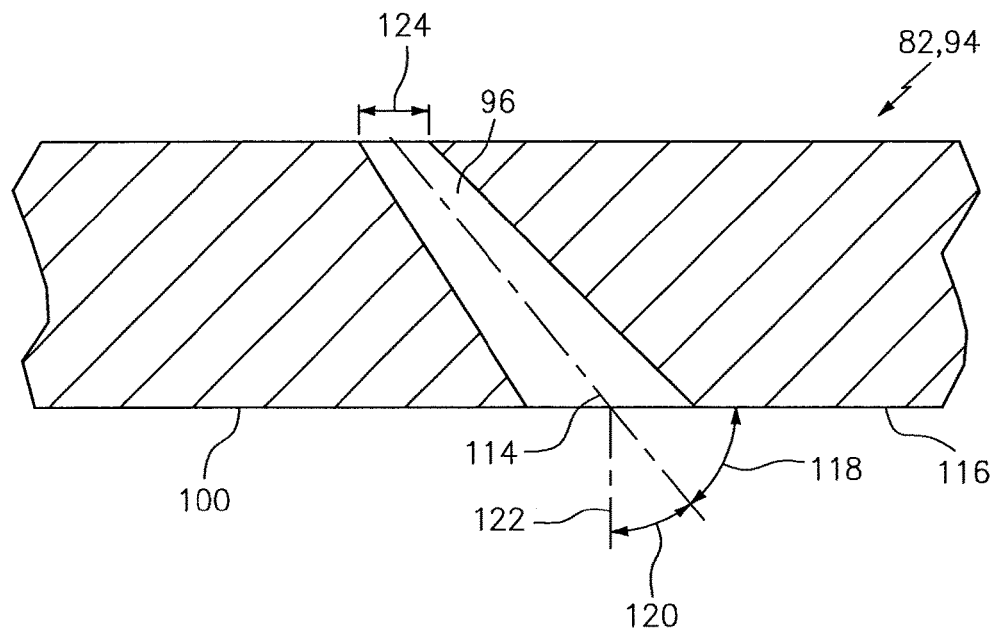
FIG. 7 is a side sectional illustration of a portion of a heat shield.

Referring to FIG. 7, each first aperture 96 extends along a centerline 114 through the panel base 100 to a combustion chamber surface 116 of the heat shield 82. The centerline 114 may be offset from the combustion chamber surface 116 by an included angle 118 that is greater than, for example, about twenty-five degrees (25°); e.g., between about twenty-five degrees (25°) and about ninety degrees (90°). The included angle 118, for example, may be equal to about thirty degrees (30°). An angle of incidence 120 is therefore defined between each first aperture 96 and the combustion chamber surface 116; e.g., an angle between the centerline 114 and an axis 122 extending perpendicularly out from the combustion chamber surface 116 at the respective first aperture 96.

Each first aperture 96 may have a circular cross-sectional geometry. Alternatively, one or more of the first apertures 96 may each have a non-circular cross-sectional geometry such as, for example, an oval or polygonal (e.g., rectangular) cross-sectional geometry. Each first aperture 96 has a width 124 (e.g., a diameter). The width 124 of each first aperture 96 may increase as the respective first aperture 96 extends through the panel 94 towards the combustion chamber surface 116 and away from the shell 120 (see FIG. 4). Alternatively, the width 124 of one or more of the first apertures 96 may remain substantially constant or decrease as each respective first aperture 96 extends through the panel 94.

Figure 8:
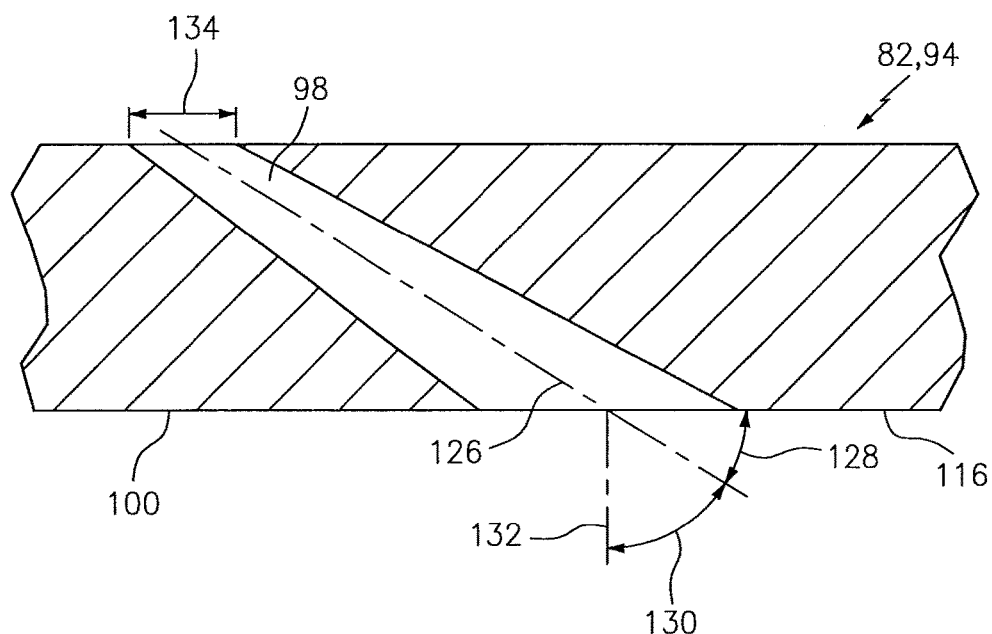
FIG. 8 is a side sectional illustration of another portion of the heat shield.

Referring to FIG. 8, each second aperture 98 extends along a centerline 126 through the panel base 100 to the combustion chamber surface 116. The centerline 126 may be offset from the combustion chamber surface 116 by an included angle 128 that is less than or substantially equal to, for example, about twenty-five degrees (25°); e.g., between zero (0°) and twenty-five degrees (25°). The included angle 128, for example, may be equal to about fifteen degrees (15°). An angle of incidence 130 is therefore defined between each second aperture 98 and the combustion chamber surface 116; e.g., a non-zero angle between the centerline 126 and an axis 132 extending perpendicularly out from the combustion chamber surface 116 at the respective second aperture 98.

Each second aperture 98 may have a circular cross-sectional geometry. Alternatively, one or more of the second apertures 98 may each have a non-circular cross-sectional geometry such as, for example, an oval or polygonal (e.g., rectangular) cross-sectional geometry. Each second aperture 98 has a width 134 (e.g., a diameter), which may be substantially equal to or different than (e.g., greater or less than) the width 124 (see FIG. 7) when measured, for example, at the combustion chamber surface 116. The width 134 of each second aperture 98 may increase as the respective second aperture 98 extends through the panel 94 towards the combustion chamber surface 116 and away from the shell (see FIG. 4). Alternatively, the width 134 of one or more of the second apertures 98 may remain substantially constant or decrease as each respective second aperture 98 extends through the panel 94.

Referring to FIG. 2, the heat shield 82 of the inner wall 76 circumscribes the shell 80 of the inner wall 76, and defines an inner side of the combustion chamber 58. The heat shield 82 of the outer wall 78 is arranged radially within the shell 80 of the outer wall 78, and defines an outer side of the combustion chamber 58. The heat shield 82 and, more particularly, each of the panels 94 may be respectively attached to the shell 80 by a plurality of mechanical attachments 136 (e.g., threaded studs); see also FIG. 5. The shell 80 and the heat shield 82 thereby respectively form the cooling cavities 84 in each of the walls 76, 78.

The cooling cavities 84 may be arranged into one or more axial sets. These axial sets are respectively arranged at discrete locations along the centerline 22. Each axial set includes one or more of the cooling cavities 84, which are arranged circumferentially around the centerline 22. Referring to FIG. 4, each of the cooling cavities 84 fluidly couples one or more of the cooling apertures 92 with one or more of the cooling apertures 96 and/or 98.

Referring to FIG. 6, each cooling cavity 84 may extend circumferentially between the rails 104 and 105 of a respective one of the panels 94. Each cooling cavity 84 may extend axially between the rails 102 and 103 of a respective one of the panels 94. Each cooling cavity 84 extends radially between the shell 80 and the panel base 100 of a respective one of the panels 94.

Referring to FIG. 4, core air from the plenum 72 is directed into each cooling cavity 84 through respective cooling apertures 92 during turbine engine 20 operation. This core air (e.g., cooling air) impinges against the panel base 100 and thereby impingement cools the heat shield 82. The core air within each cooling cavity 84 is subsequently directed through respective cooling apertures 96 and 98 into the combustion chamber 58 to film cool a downstream portion of the heat shield 82. Within each cooling aperture 96, 98, the core air also cools the heat shield 82 through conductive heat transfer.

Referring to FIGS. 7 and 8, cooling effectiveness of a heat shield cooling aperture may increase as the included angle (e.g., the angle 118, 128) decreases and the angle of incidence (e.g., the angle 120, 130) increases. For example, as the included angle decreases, a length of the cooling aperture through the heat shield increases and thereby increases available surface area for conductive heat transfer. Thus, all other aspects being equal, each second aperture 98 may have a higher cooling effectiveness than each first aperture 96. Decreasing the included angle, however, may also increase heat shield 82 manufacturing costs and/or time. Therefore, by including both the first apertures 96 and the second apertures 98, the heat shield 82 may receive additional cooling without unduly increasing its manufacturing costs.

Certain regions of the heat shield 82 may be subject to higher temperatures than other regions. The heat shield panel 94 of FIG. 9, for example, includes one or more high temperature regions 138-142 and at least one low temperature region 144. During engine operation, the temperature of the panel 94 in the high temperature regions 138-142 may be greater than that in the low temperature region 144 since each of the regions 138-142 typically includes at least one feature that blocks or otherwise reduces impingement airflow to the panel base 100. For example, the high temperature regions 138-141 are respectively located at the rails 102-105. The high temperature regions 142 are located at the mechanical attachments 136. In contrast, the low temperature region 144 is centrally located on the panel 94 where air may freely impinge against and, thus, more effectively cool the panel base 100.

In some embodiments, a majority (e.g., more than fifty percent) or substantially all of the second apertures 98 in a respective panel 94 may be located in one or more of the high temperature regions 138-142. One or more of the first apertures 96 may also be located in one or more of the high temperature regions 138-142. Alternatively, substantially all of the first apertures 96 may be located in the low temperature region 144. In other embodiments, of course, the first and/or second apertures 98 may be uniformly distributed in the panel 94 between the high temperature region 144 and/or the low temperature regions 138-142.

Figure 9:
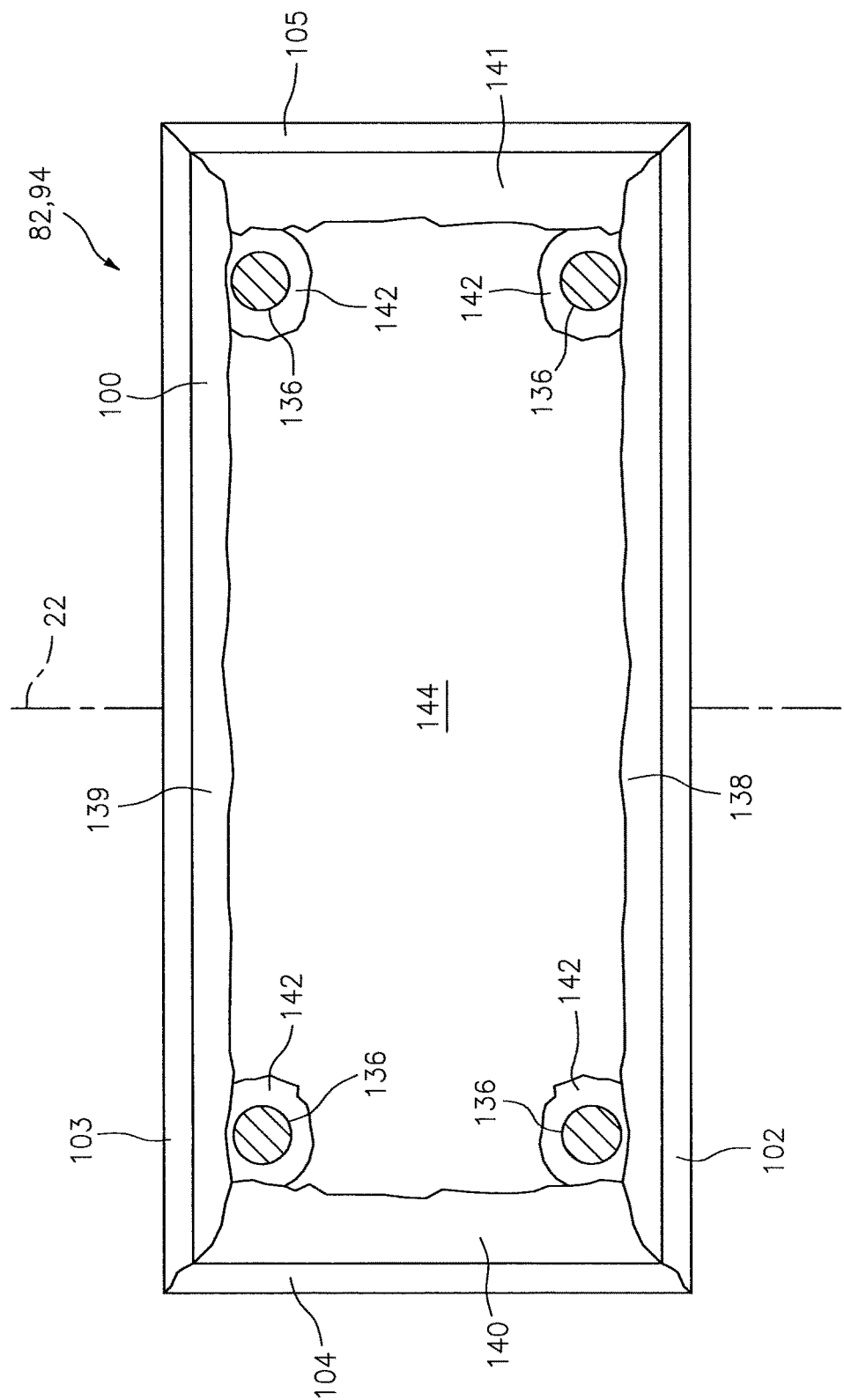
FIG. 9 is another sectional illustration of the heat shield panel.

It should be noted that the example given above with respect to FIG. 9 is provided to describe how the rails 102-105 and/or other protrusions such as the mechanical attachments 136 may influence temperature gradients of the panel 94. Of course, in practice, the configuration of other combustor components and/or flow characteristics of the core air within the combustion chamber 58 may change the shape and/or magnitude of one or more of the foregoing regions 138-142 and 144. For example, the region 138 may be hotter than the region 139. The region 140 may be hotter than the region 141. Similarly, some of the regions 142 may be hotter than others. In addition, the region 144 may include a plurality of sub-regions, some of which are hotter than others.

The foregoing temperature gradients may be accommodated by configuring each panel 94 with (i) more of (or only) the second cooling apertures 98 in the high temperature region(s), and (ii) more of (or only) the first cooling apertures 96 in the low temperature region(s). For example, a density of the first cooling apertures 96 in the region 139 may be higher than a density of the first cooling apertures 96 in the region 138. Conversely, a density of the second cooling apertures 98 in the region 139 may be less than a density of the second cooling apertures 98 in the region 138. The term "density" may describe a ratio of a quantity of cooling apertures per square unit of panel base surface. In this manner, the regions of the panel 94 that are subject to higher temperatures may receive more cooling than the regions of the panel 94 that are subject to lower temperatures.

Figure 10:
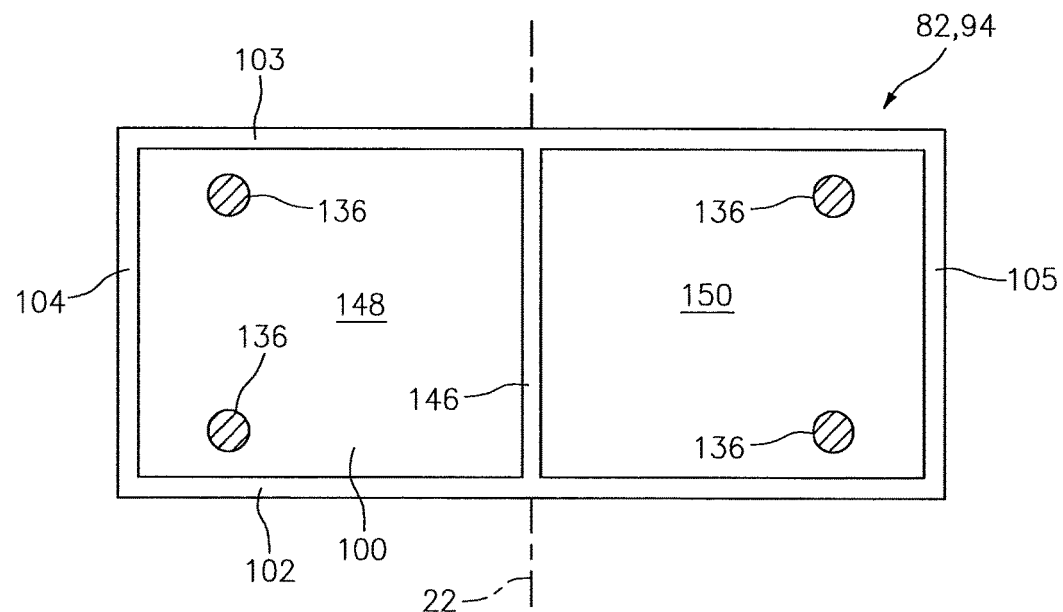
FIG. 10 is a sectional illustration of an alternate embodiment heat shield panel.
Figure 11:
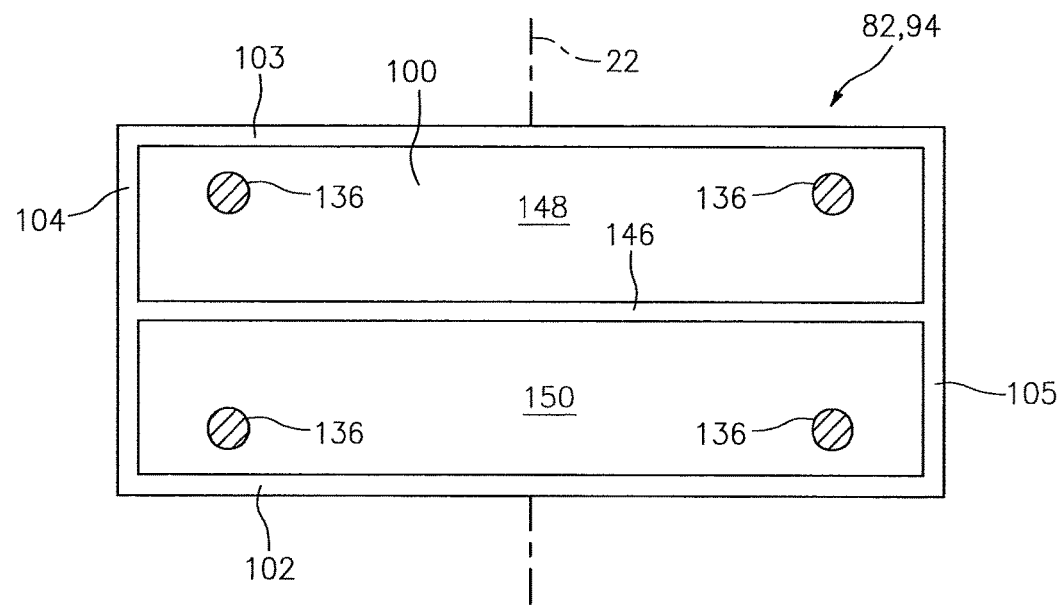
FIG. 11 is a sectional illustration of another alternate embodiment heat shield panel.

FIGS. 10 and 11 illustrate alternative embodiment panels 94. It should be noted that each panel 94 may include one or more cooling apertures (e.g., first and/or second apertures 96 and 98). For ease of illustration, however, the panels 94 of FIGS. 10 and 11 are shown without the cooling apertures 96 and 98.

One or more of the panels 94 may each include at least one intermediate rail 146. The intermediate rail 146 of FIG. 10 extends axially between and is connected to the rails 102 and 103. The intermediate rail 146 of FIG. 11 extends axially between and is connected to the rails 104 and 105. In this manner, the panels 94 of FIGS. 10 and 11 may each define a plurality of the cooling cavities 84; e.g., a first cavity 148 and a second cavity 150.

The first and the second cavities 148 and 150 may each be fluidly coupled with one or more of the first apertures 96 and one or more of the second apertures 98. Alternatively, each of the cooling apertures fluidly coupled with the first cavity 148 may be a first aperture 96. Each of the cooling apertures fluidly coupled with the second cavity 150 may be a second aperture 98. In this manner, the flow of core air into each cooling cavity 148, 150 may be tailored to the type of cooling apertures to which it is fluidly coupled with. Notably, a similar tailored configuration may be achieved where each of the cooling apertures included in a first of the panels 94 is a first aperture 96, and each of the cooling apertures included in a second of the panels 94 is a second aperture 98.

The heat shield 82 is described above as including the first apertures 96 and the second apertures 98. In some embodiments, however, the heat shield 82 may also include one or more additional cooling apertures with different angles of incidence than those of the first apertures 96 and the second apertures 98. The present invention therefore is not limited to any particular numbers of different cooling aperture configurations.

In some embodiments, the bulkhead 74 may also or alternatively be configured with a multi-walled structure (e.g., a hollow dual-walled structure) similar to that described above with respect to the inner wall 76 and the outer wall 78. The bulkhead 74, for example, may include a shell and a heat shield with a similar multi-cooling aperture configuration as described above with respect to the heat shield 82.

One or more of the foregoing cooling apertures may be formed in the heat shield using manufacturing processes such as, for example, laser drilling, electrical discharge machining (EDM) drilling and/or water jet drilling. One or more of the cooling apertures may also or alternatively be formed by casting the apertures into the heat shield, and/or forming the apertures concurrently with the heat shield body using, for example, additive manufacturing. The present invention, however, is not limited to any particular manufacturing processes.

The terms "upstream", "downstream", "inner" and "outer" are used to orientate the components of the turbine engine assembly 62 and the combustor 64 described above relative to the turbine engine 20 and its centerline 22. A person of skill in the art will recognize, however, one or more of these components may be utilized in other orientations than those described above. The present invention therefore is not limited to any particular spatial orientations.

The turbine engine assembly 62 may be included in various turbine engines other than the one described above. The turbine engine assembly 62, for example, may be included in a geared turbine engine where a gear train connects one or more shafts to one or more rotors in a fan section, a compressor section and/or any other engine section. Alternatively, the turbine engine assembly 62 may be included in a turbine engine configured without a gear train. The turbine engine assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A combustor for a turbine engine, the combustor comprising:
   a combustor wall including a shell and a heat shield attached to the shell;
   the heat shield defining a plurality of effusion apertures that includes a first effusion aperture and a second effusion aperture;
   wherein the first effusion aperture extends along a centerline that is offset from a surface of the heat shield by a first angle, the first angle being greater than 0° and less than 90°, and the second effusion aperture extends along a centerline that is offset from the surface by a second angle, the second angle being greater than 0° and less than 90°, wherein the second angle is different than the first angle;
   wherein the first effusion aperture is one of a plurality of first effusion apertures defined in the heat shield, and a density of the plurality of first effusion apertures in a first region of the heat shield is greater than a density of the plurality of first effusion apertures in a second region of the heat shield, wherein the density of the plurality of first effusion apertures in the second region of the heat shield is greater than zero; and
   wherein the second effusion aperture is one of a plurality of second effusion apertures defined in the heat shield, and a density of the plurality of second effusion apertures in the second region of the heat shield is greater than a density of the plurality of second effusion apertures in the first region of the heat shield, wherein the density of the plurality of second effusion apertures in the first region of the heat shield is greater than zero.

2. The combustor of claim 1, wherein
   a plurality of cooling cavities are defined between the shell and the heat shield;
   at least one first effusion aperture of the plurality of first effusion apertures is fluidly coupled with a first cooling cavity of the plurality of cooling cavities; and
   at least one second effusion aperture of the plurality of second effusion apertures is fluidly coupled with a second cooling cavity of the plurality of cooling cavities.

3. A combustor for a turbine engine, the combustor comprising:
   a combustor wall including a shell and a heat shield attached to the shell;
   wherein one or more cooling cavities are defined between the shell and the heat shield and fluidly couple a plurality of apertures defined in the shell with a plurality of apertures defined in the heat shield; and
   wherein the plurality of apertures in the heat shield include a first aperture and a second aperture, an angle of incidence between the first aperture and a surface of the heat shield is greater than 0° and less than 90°, an angle of incidence between the second aperture and the surface is greater than 0° and less than 90°, and the angle of incidence between the first aperture and the surface is different than the angle of incidence between the second aperture and the surface;
   wherein the first aperture is one of a plurality of first apertures defined in the heat shield, and a density of the plurality of first apertures in a first region of the heat shield is greater than a density of the plurality of first apertures in a second region of the heat shield, wherein the density of the plurality of first apertures in the second region of the heat shield is greater than zero; and
   wherein the second aperture is one of a plurality of second apertures defined in the heat shield, and a density of the plurality of second apertures in the first region of the heat shield is less than a density of the plurality of second apertures in the second region of the heat shield, wherein the density of the plurality of second apertures in the first region is greater than zero.

4. The combustor of claim 3, wherein
   the one or more cooling cavities include a first cavity and a second cavity;
   at least one first aperture of the plurality of first apertures is fluidly coupled with the first cavity; and
   at least one second aperture of the plurality of second apertures is fluidly coupled with the second cavity.

5. The combustor of claim 4, wherein the combustor wall further includes a rail arranged between the first cavity and the second cavity.

6. The combustor of claim 3, wherein the one or more cooling cavities include a first cavity; and
   at least one first aperture of the plurality of first apertures and at least one first aperture of the plurality of second apertures are fluidly coupled with the first cavity.

7. The combustor of claim 3, wherein the heat shield includes a plurality of panels; and a first panel of the plurality of panels includes the plurality of first apertures and the plurality of second apertures.

8. The combustor of claim 7, wherein
   the first panel of the plurality of panels includes an upstream end and a downstream end;
   at least one second aperture of the plurality of second apertures is located at the downstream end; and
   the angle of incidence of each second aperture of the plurality of second apertures is greater than the angle of incidence of each first aperture of the plurality of first apertures.

9. The combustor of claim 3, wherein
   the heat shield includes a plurality of panels;
   a first panel of the plurality of panels includes at least one first aperture of the plurality of first apertures; and
   a second panel of the plurality of panels includes at least one second aperture of the plurality of second apertures.

10. The combustor of claim 3, wherein a diameter of at least one first aperture of the plurality of first apertures at the surface is substantially equal to a diameter of at least one second aperture of the plurality of second apertures at the surface.

11. The combustor of claim 3, wherein a diameter of at least one first aperture of the plurality of first apertures at the surface is different than a diameter of at least one second aperture of the plurality of second apertures at the surface.

12. The combustor of claim 3, wherein a diameter of at least one first aperture of the plurality of first apertures increases as the at least one first aperture extends through the heat shield away from the shell.

13. The combustor of claim 3, wherein the density of the plurality of first apertures in the first region and the density of the plurality of first apertures in the second region are configured to provide more cooling to the first region than to the second region.

* * * * *